United States Patent
Yamamoto (10) Patent No.: US 7,457,558 B2
(45) Date of Patent: Nov. 25, 2008

(54) IMAGE FORMING SYSTEM THAT INCLUDES STORAGE BATTERY

(75) Inventor: Naoyuki Yamamoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 11/561,818

(22) Filed: Nov. 20, 2006

(65) Prior Publication Data

US 2007/0122174 A1    May 31, 2007

(30) Foreign Application Priority Data

Nov. 28, 2005   (JP) ............... 2005-342557

(51) Int. Cl.
*G03G 15/00* (2006.01)
(52) U.S. Cl. ...................................... 399/88
(58) Field of Classification Search ............ 399/88, 399/90
See application file for complete search history.

(56) References Cited

U.S. PATENT DOCUMENTS 7,016,623 B2 * 3/2006 Isobe ........................ 399/88
7,099,605 B2 * 8/2006 Namiki ...................... 399/88
7,260,337 B2   8/2007 Koyama

FOREIGN PATENT DOCUMENTS

| CN | 1652043 A | 8/2005 |
|---|---|---|
| EP | 1562083 A2 | 8/2000 |
| JP | 2002-014574 A | 1/2002 |

* cited by examiner

*Primary Examiner*—Sandra L Brase
(74) *Attorney, Agent, or Firm*—Canon U.S.A., Inc. I.P. Division (57) ABSTRACT

An image forming system includes an image forming apparatus that forms an image on a sheet and a peripheral device that is connected to the image forming apparatus. The image forming system includes an electrical power supply unit, a driving unit, a secondary battery that is charged with electrical power from the electrical power supply unit, an electrical power changing device that activates or deactivates a first supply path for supplying electrical power from the electrical power supply unit to the secondary battery and activates or deactivates a second supply path for supplying electrical power from the secondary battery to the driving unit, and a controller unit that controls the electrical power changing device so as to deactivate the first supply path and activate the second supply path when initialization of the image forming system is performed.

9 Claims, 8 Drawing Sheets

IMAGE FORMING SYSTEM THAT INCLUDES STORAGE BATTERY

BACKGROUND OF THE INVENTION

1. Field of the Invention

The present invention relates to an image forming system that can control electrical power supplied to peripheral devices connected to an image forming apparatus.

2. Description of the Related Art

Copying machines, printers, or facsimile machines are in many cases used with the electrical power supply being left on all the time. A reduction in the electrical power consumption of such apparatuses is desirable.

An electrophotographic image forming apparatus includes a fixing unit that fuses a toner image onto paper by heat. A fixing unit consumes much of the electrical power supplied to the image forming apparatus. Thus, it is important to reduce electrical power consumed by the fixing unit in order to reduce the total electrical power consumption. Currently, a type of power-saving of the image forming apparatus is widely used, which has a power-saving mode in which the temperature of the fixing unit is decreased. Recent image forming apparatuses have a power-saving mode in which, when a second image forming operation has not been started for a predetermined period of time after completing first image forming operation, the temperature of the fixing units is decreased.

Thus, in the power-saving mode, electrical power consumption is reduced by stopping or reducing the supply of electrical power to the fixing unit. When the power-saving mode is released, initialization is performed in the image forming apparatus. When initialization is performed in the image forming apparatus, a fusing temperature, at which a toner image can be sufficiently fused, needs to be quickly reached by supplying sufficient electrical power to the fixing unit. However, there is a limit on electrical power that can be supplied at one time. For example, in Japan, when electrical power is supplied from an ordinary socket, the maximum electrical power is 1500 W for one circuit. Thus, when electrical power of 1500 W or more is needed for startup, a special electrical power line, for example, a specific socket, is needed, thereby significantly impairing the versatility and installability of the apparatus.

In view of this problem, an image forming apparatus is proposed in Japanese Patent Laid-Open No. 2002-014574, which includes a plurality of energy supply units that can supply electrical power within the image forming apparatus. In such an image forming apparatus, the time of transition from a power-saving status (power-saving mode) to a standby status (standby mode) in which said image forming apparatus is ready to start an image forming operation can be reduced regardless of the power rating of a socket.

In general, various types of optional device (herein, also called an accessory or a peripheral device) that expand the functions of an image forming apparatus can be connected to the image forming apparatus at the user's request. A typical optional device is a high-capacity paper deck, a stapler unit, a paper folding unit, a sorting unit, a punching unit, an inserting unit, a cutting unit, an automatic document feeder, or a glossing unit. A high-capacity paper deck can feed a large number of sheets of paper. A stapler unit staples sheets of paper on which images are formed. A paper folding unit folds sheets of paper. A sorting unit sorts sheets of paper. A punching unit punches holes in sheets of paper. An automatic reversing document feeder is used when images are formed on both sides of a sheet of paper. An inserting unit inserts sheets of paper of one type between sheets of paper of another type. A cutting unit can cut a large number of sheets of paper all at once. An automatic document feeder automatically feeds a document into a reading position. A glossing unit gives a gloss to an image formed on a sheet of paper. In general, such optional devices operate using electrical power supplied from an image forming apparatus to which the optional devices are connected.

However, there is a problem with the foregoing known image forming apparatus. Namely, the image forming apparatus needs to include a high-capacity energy supply unit that can supply electrical power to a plurality of energy supply units. This increases the size and cost of the image forming apparatus.

Furthermore, during initialization of the image forming apparatus, initialization of optional devices connected to the image forming apparatus is executed in parallel. In initialization of optional devices, for example, operations of the individual optional devices and any remaining sheet of paper are checked. Thus, the image forming apparatus can supply to the fixing unit only as much electrical power as the maximum electrical power of 1500 W minus electrical power necessary for initialization of the optional devices.

Since the optional devices are connected to the image forming apparatus on the user's request at any time, it is presumed that all of the optional devices are connected to the image forming apparatus regardless of whether the optional devices are actually connected to the image forming apparatus. Thus, only as much electrical power as the maximum electrical power minus electrical power necessary for the optional devices can be supplied to the fixing unit.

Although the maximum electrical power is entirely available to the image forming apparatus when the image forming apparatus is used with no optional device being connected to the image forming apparatus, sufficient electrical power cannot be used by the image forming apparatus when such optional devices are connected. That is to say, since only as much electrical power as the maximum electrical power minus electrical power necessary to operate all of the optional devices is available, the startup of the image forming apparatus is delayed, and electrical power consumption and unnecessary cost are increased.

SUMMARY OF THE INVENTION

The present invention provides an image forming system that addresses the foregoing problems.

The present invention provides an image forming system that can supply sufficient electrical power to a fixing unit included in an image forming apparatus regardless of whether any peripheral device is connected to the image forming apparatus.

The present invention provides an image forming system that includes a secondary battery that supplies electrical power to peripheral devices so that the secondary battery is efficiently used.

An image forming system according to a first aspect of the present invention includes an image forming apparatus that forms an image on a sheet and a peripheral device that is connected to the image forming apparatus. The image forming system includes an electrical power supply unit that, provided in the image forming apparatus, supplies electrical power to the image forming apparatus and the peripheral device, a driving unit that, provided in the peripheral device, drives load on the peripheral device, a secondary battery that, provided in the peripheral device, supplies electrical power to the driving unit and is charged with electrical power from the electrical power supply unit, an electrical power changing device that activates or deactivates a first supply path for supplying electrical power from the electrical power supply unit to the secondary battery and activates or deactivates a second supply path for supplying electrical power from the secondary battery to the driving unit, and a controller unit that controls the electrical power changing device so as to deactivate the first supply path and activate the second supply path when initialization of the image forming system is performed.

Further features of the present invention will become apparent from the following description of exemplary embodiments with reference to the attached drawings.

DESCRIPTION OF THE EMBODIMENTS

Image forming systems according to exemplary embodiments of the present invention will now be described with reference to the drawings.

First Exemplary Embodiment

Figure 1:
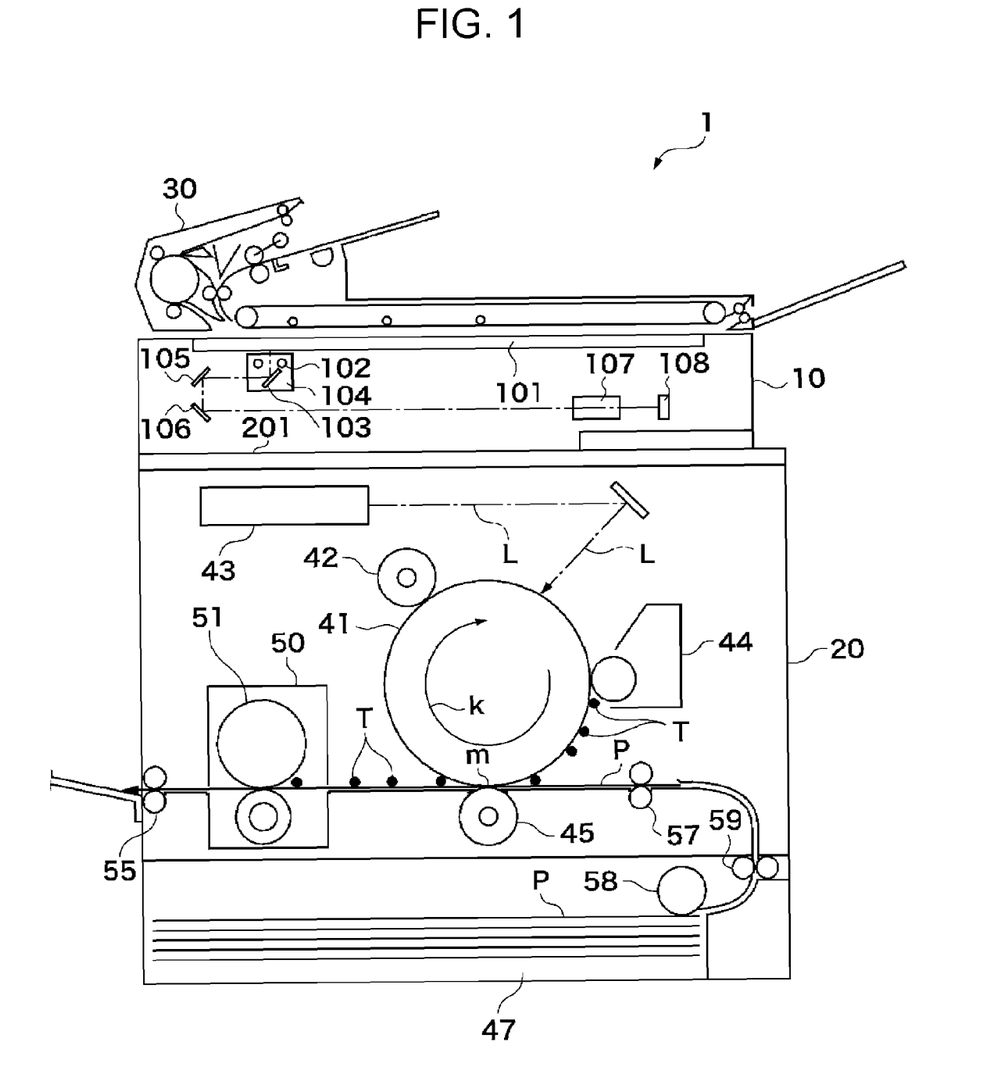
FIG. 1 is a longitudinal sectional view showing the structure of an image forming system according to a first exemplary embodiment.

FIG. 1 is a longitudinal sectional view showing the structure of an image forming system 1 according to a first exemplary embodiment of the present invention. The image forming system 1 includes a reader section 10 and a printer section 20. The reader section 10 is connected to the printer section 20 via a communication cable (not shown). A controller unit 310 (shown in FIG. 3) in the printer section 20 controls the reader section 10 via the communication cable. The reader section 10 functions as a peripheral device of the printer section 20.

The reader section 10 reads an image of a document and converts the image to image data. A document feeder 30 that feeds documents is connected to the reader section 10. The body of the reader section 10 includes a scanner unit 104, mirrors 105 and 106, a lens 107, and an image sensor unit 108, for example, a charge coupled device (CCD), that includes photoelectric transducers. The scanner unit 104 includes a lamp 102 and a mirror 103.

In the reader section 10, documents held in a tray of the document feeder 30 are sequentially fed onto a platen glass 101 one by one. When a document is fed into a predetermined position on the platen glass 101, the lamp 102 in the scanner unit 104 is turned on to emit light beams onto the document while the scanner unit 104 moves toward the right in the drawing (in the direction of sub-scanning). The light beams reflected from the document enter the image sensor unit 108 via the mirrors 103, 105, and 106 and the lens 107. Then, electrical processing, such as, photoelectric conversion, and general digital processing are performed on the light beams reflected from the document having entered the image sensor unit 108. The signals having been subjected to digital processing are output to the printer section 20.

The printer section 20 forms a visible image on a sheet of paper on the basis of the input image data. The printer section 20 includes a laser-beam scanner 43, a photoconductive drum 41, a primary charger 42, a developer unit 44, a paper cassette 47, a transfer roller 45, a fixing unit 50, paper eject rollers 55, conveying rollers 57 and 59, and a paper feed roller 58. The photoconductive drum 41 is rotated at a predetermined peripheral speed (processing speed) in the direction indicated by an arrow k in the drawing. The photoconductive drum 41 is evenly charged by the primary charger 42 while it is being rotated.

The laser-beam scanner 43 emits a laser beam L that is modulated, corresponding to the image signals from the reader section 10, and the surface of the charged photoconductive drum 41 is scanned and exposed to the laser beam L. An electrostatic latent image corresponding to the image data is formed on the photoconductive drum 41 by this operation.

In the developer unit 44, the electrostatic latent image is subjected to reversal development using powder toner and visualized as a toner image T. In reversal development, toner is attracted to an area of the surface of the photoconductive drum 41, the area having been exposed to the laser beam L.

Recording material P is fed by the paper feed roller 58 from the paper cassette 47. The recording material P is conveyed by the conveying rollers 59 and stopped in the position of the conveying rollers 57. The recording material P is then fed into a nip (a transfer area) m between the photoconductive drum 41 and the transfer roller 45, to which a transfer bias voltage is applied, in synchronization with the rotation of the photoconductive drum 41. Then, the toner image T on the photoconductive drum 41 is transferred to a surface of the recording material P by the transfer bias.

The recording material P, to which the toner image T, which has not been fixed, is transferred, is removed from the photoconductive drum 41 and fed into the fixing unit 50. The fixing unit 50 includes a heating roller 51 that is maintained at a predetermined fusing temperature by a temperature controller (not shown) and fixes the toner image T transferred to the recording material P with the heating roller 51. The recording material P having been subjected to fixing is ejected to the exterior of the image forming system 1 by the paper eject rollers 55.

When a predetermined time has elapsed without an image forming operation being performed after ejecting the recording material P, on which an image has been formed, the supply of electrical power to the fixing unit 50, the image forming unit 60, and the like is stopped or reduced until the next instruction is submitted to perform an image forming operation, and then the image forming system 1 enters a power-saving status. In a power-saving status, the fixing unit 50 is maintained at a predetermined temperature that is lower than the fusing temperature, at which images can be formed.

Figure 2:
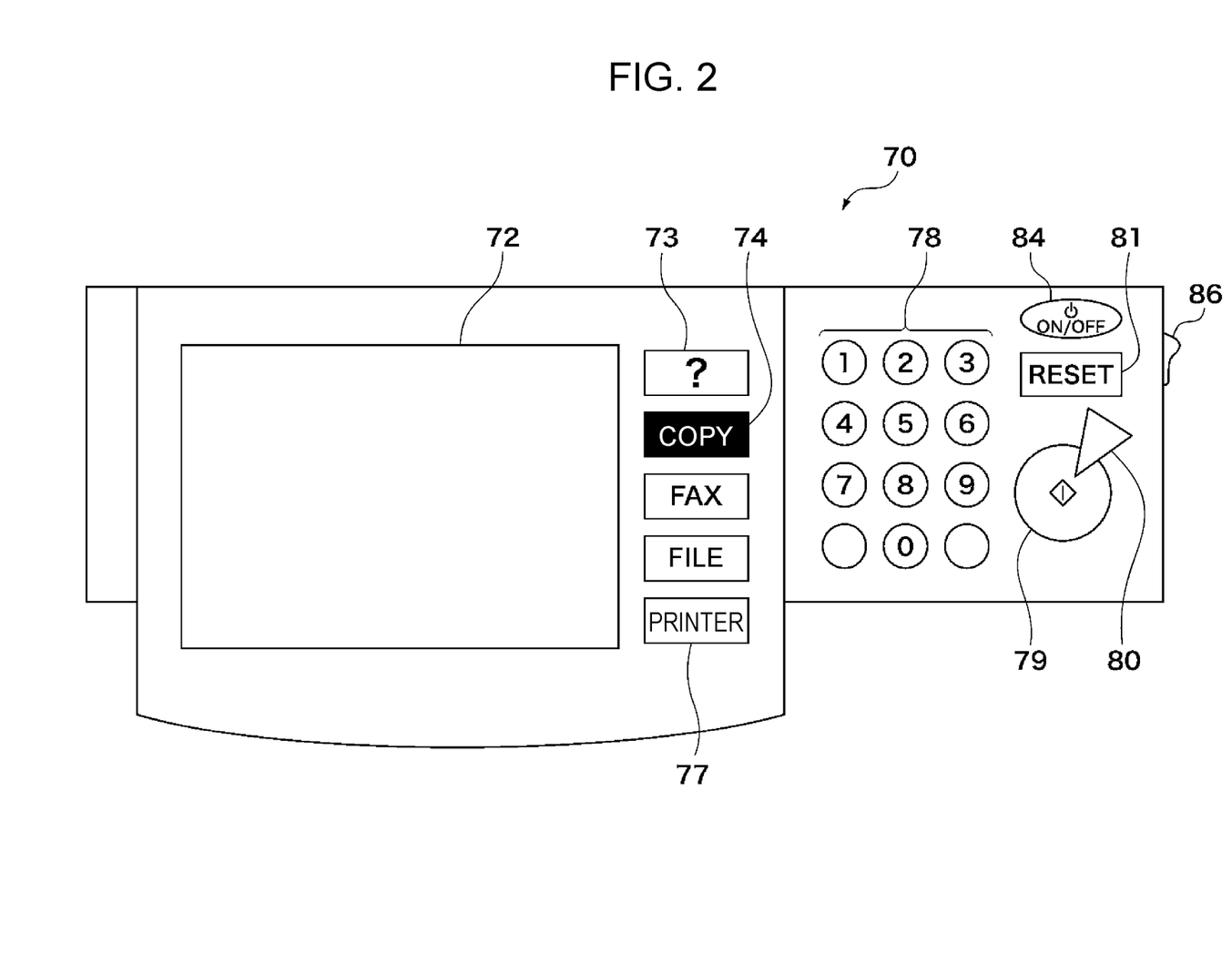
FIG. 2 is an external view of an operation unit included in a printer section.

FIG. 2 is an external view of an operation unit 70 included in the printer section 20. The operation unit 70 includes a liquid crystal display (LCD) 72 and various types of key and switch. A touch panel sheet is attached to the surface of the LCD 72. A system operation screen is displayed on the LCD 72. When a part of the touch panel corresponding to the position of one of the displayed keys is pressed, the positional information is sent to the controller unit 310, which is described below. A power switch 86 for turning on and off a commercial power supply is provided on a side of the operation unit 70.

A numeric keypad 78 is used to input figures, such as the number of copies. A start key 79 is used to start operation (image forming operation) for reading an original document image. A stop key 80 is used to stop image forming operation in progress. A reset key 81 is used to reset the input setting using the operation unit 70. A sleep/return key 84 is used to cause the image forming system 1 to enter a sleep status (the power-saving mode) or return from a sleep status to a standby status. A guide key 73 is used to display the description of the function of each key. A copy-mode key 74 is pressed to cause the image forming system 1 to function as a copying machine. A printer key 77 is used to, for example, configure settings related to print output from an external device such as a computer.

Figure 3:
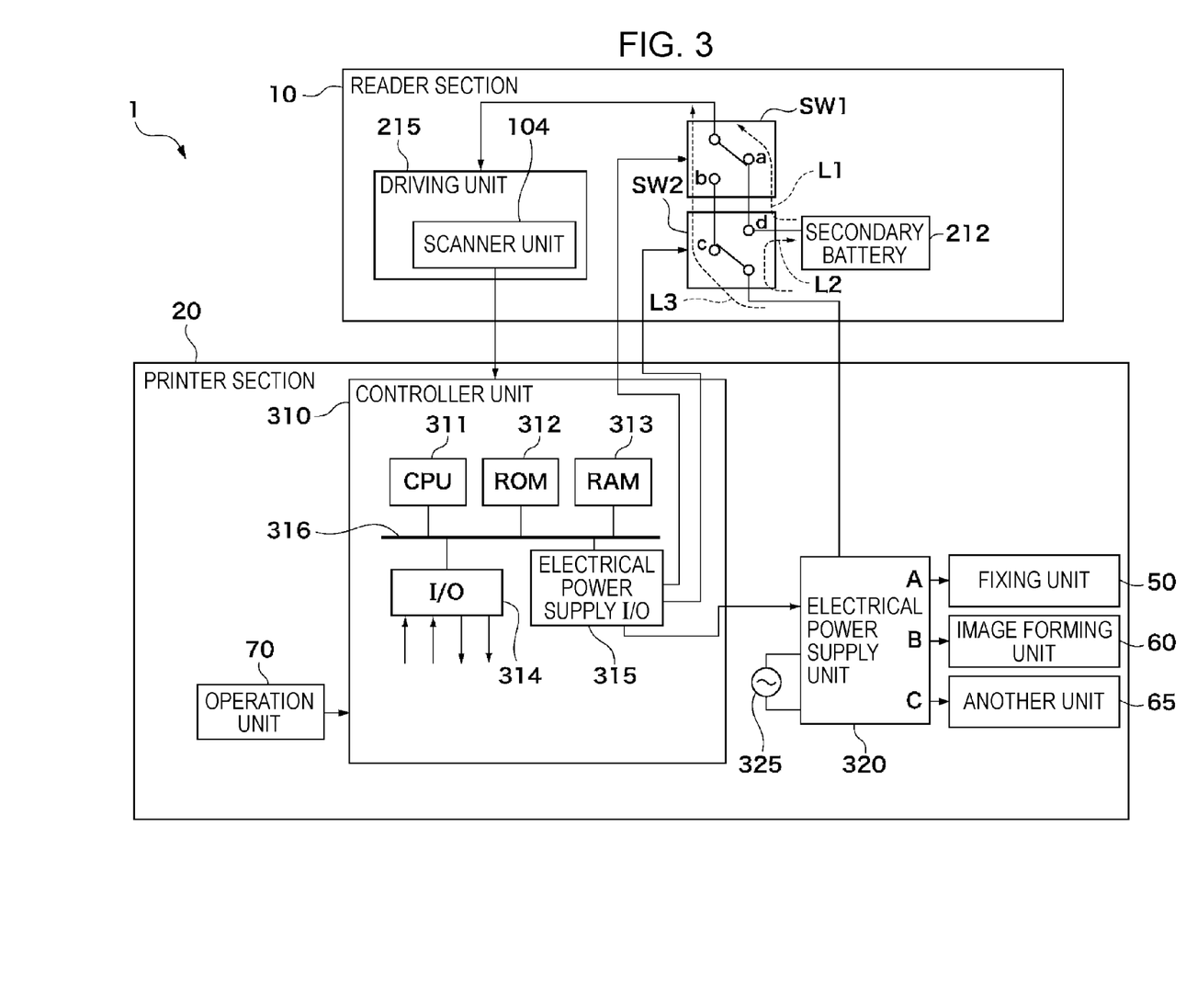
FIG. 3 is an illustration showing the structures of parts related to electrical power supplies of a reader section and the printer section.

FIG. 3 is an illustration showing the structures of parts related to electrical power supplies of the reader section 10 and the printer section 20. The reader section 10 includes a secondary battery 212 that is charged and discharges electricity and a pair of electrical power changing switches SW1 and SW2 for supplying electrical power to a driving unit 215 that includes the scanner unit 104. The secondary battery 212 is a battery that can be electrochemically charged repeatedly, or a capacitor. For example, a nickel metal hydride battery, a lithium ion battery, or an electric double layer capacitor may be used. The secondary battery 212 has a function of supplying electrical power to the reader section 10.

The foregoing operation unit 70 is connected to the printer section 20. The printer section 20 includes the controller unit 310, which performs overall control of the image forming operation, an electrical power supply unit 320, and the like. A central processing unit (CPU) 311, a read only memory (ROM) 312, a random access memory (RAM) 313, an input/output (I/O) interface 314, which are generally known, and an electrical power supply I/O interface 315 are connected to the controller unit 310 via a bus 316. The CPU 311 controls the switching operations of the electrical power changing switches SW1 and SW2 connected to the electrical power supply I/O interface 315 and controls the on/off state of the electrical power supply unit 320 according to an electrical power supply control program. This electrical power supply control program is stored in the ROM 312. The details of the program are described below. Various types of component necessary for image forming operation are connected to the I/O interface 314, for example, a paper-size detecting sensor, a thermistor, a high-voltage control circuit, a beam detecting sensor, and a driving motor. The CPU 311 controls image forming operations using these components.

The electrical power supply unit 320 gets electrical power from a commercial power supply 325 and supplies electrical power to the fixing unit 50 via terminal A, the image forming unit 60 via terminal B, and another unit 65 in the printer section 20 via terminal C. The image forming unit 60 includes components that perform image forming, for example, the photoconductive drum 41 and the primary charger 42, a control circuit that controls these components, and an image processing unit. The other unit 65 includes, for example, the paper feed roller 58, which feeds paper from the paper cassette 47, and a control circuit (not shown) that controls the operation unit 70. Electrical power is supplied to the controller unit 310 from an output terminal C. The commercial power supply 325 is provided by an electrical power company and is an alternating-current power supply of 100 V/15 A in Japan. The electrical power supply unit 320 is activated and stopped in response to an on/off signal from the electrical power supply I/O interface 315. The magnitude of the electrical power that is supplied from the electrical power supply unit 320 to each of the fixing unit 50, the image forming unit 60, and the other unit 65 can be predetermined.

In the present exemplary embodiment, even when the power switch 86 is turned off, the controller unit 310 operates in the power-saving mode using a built-in battery (not shown) and monitors the status of the power switch 86. When the electrical power supply unit 320 has been activated upon turning on the power switch 86, the controller unit 310 gets electrical power from the output terminal C of the electrical power supply unit 320. The controller unit 310 may not include the built-in battery. Alternatively, the controller unit 310 may be activated at the same time the electrical power supply unit 320 is activated upon turning on the power switch 86.

In the printer section 20, during initialization, the electrical power supply unit 320 supplies electrical power to the fixing unit 50, the image forming unit 60, and the other unit 65. Initialization represents operation during a period between the time when the electrical power supply of the image forming system 1 has been turned on or when the power-saving mode has been released and the time when the temperature of the fixing unit 50 reaches the predetermined fusing temperature (operating temperature).

The electrical power supply unit 320 supplies electrical power of 1400 W to the fixing unit 50, out of the maximum electrical power of 1500 W of the commercial power supply 325. The supplied electrical power is used during initialization to, for example, check the operation of the fixing unit 50, and whether the recording material P is remaining, and to heat the fixing unit 50. The electrical power supply unit 320 supplies electrical power of 60 W to the image forming unit 60. The supplied electrical power is used during initialization to check the status of the photoconductive drum 41, the laser-beam scanner 43, and the like. The electrical power supply unit 320 supplies electrical power of 40 W to the other unit 65. This electrical power is used during initialization to check whether the recording material P is remaining and the status of the other unit 65. The user can determine the distribution ratio of the electrical power.

In the reader section 10, during initialization, the electrical power changing switch SW1 is switched to contact a (the on side), and the electrical power changing switch SW2 is switched to contact c (the off side). Electrical power is supplied from the secondary battery 212 to the driving unit 215 by this operation (refer to a dotted line L1 in the drawing). In the present exemplary embodiment, electrical power of 80 W is supplied from the secondary battery 212 to the driving unit 215 and used to, for example, check whether the light source is turned on and the operation of the reader section 10.

When the initial check of the individual components has been completed, and when the temperature of the fixing unit 50 has reached the predetermined fusing temperature, the image forming system 1 enters standby status in which images can be formed. In standby status, the electrical power changing switch SW1 is switched to a contact b (the off side), and the electrical power changing switch SW2 is switched to a contact d (the on side). The secondary battery 212 is charged with electrical power from the electrical power supply unit 320 by this operation (refer to a dotted line L2 in the drawing).

Then, during image forming operation, the electrical power changing switch SW1 is switched to the contact b, and the electrical power changing switch SW2 is switched to the contact c. Electrical power is supplied from the electrical power supply unit 320 to the driving unit 215 by this operation (refer to a dotted line L3 in the drawing).

Figure 4:
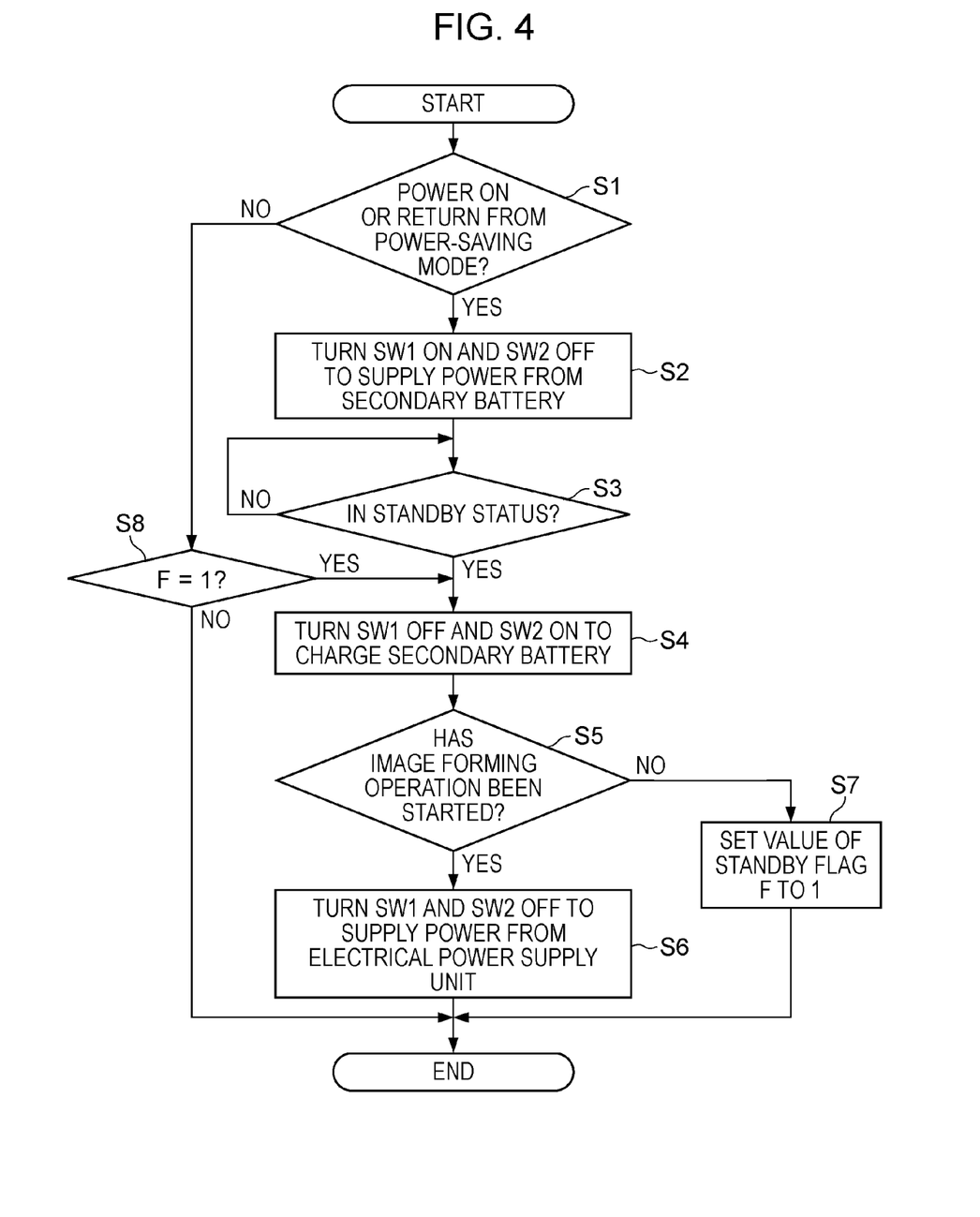
FIG. 4 is a flowchart showing the control process of electrical power supply changing.

FIG. 4 is a flowchart showing the control process of electrical power supply changing. This processing program is stored in the ROM 312 and executed by the CPU 311 at predetermined intervals. In step S1, the CPU 311 first determines whether the power switch 86 included in the operation unit 70 has been turned on or the sleep/return key 84 has been pressed in the power-saving mode.

When the CPU 311 determines that the power switch 86 has been turned on or the sleep/return key 84 has been pressed, the CPU 311 starts initialization. That is to say, in step S2, the CPU 311 switches the electrical power changing switch SW1 to the contact a (the on side) and the electrical power changing switch SW2 to the contact c (the off side) via the electrical power supply I/O interface 315. Electrical power is supplied from the secondary battery 212 to the driving unit 215 in the reader section 10 by this operation. At the same time, the electrical power supply I/O interface 315 outputs an activation signal to the electrical power supply unit 320. The electrical power supply unit 320 is activated in response to the activation signal and starts to supply electrical power to the fixing unit 50, the image forming unit 60, and the other unit 65 in the printer section 20 in the foregoing distribution ratio.

Then, in step S3, the CPU 311 waits until the initial check has been completed and the temperature of the fixing unit 50 has reached the predetermined fusing temperature, so that the image forming system 1 enters the standby status in which images can be formed.

When the image forming system 1 has entered the standby status, the process proceeds to step S4. In step S4, the CPU 311 switches the electrical power changing switch SW1 to the contact b (the off side) and the electrical power changing switch SW2 to the contact d (the on side) via the electrical power supply I/O interface 315. The secondary battery 212 is charged with electrical power from the electrical power supply unit 320 by this operation.

Then, in step S5, the CPU 311 determines whether image forming operation has been started by pressing the start key 79 in the operation unit 70. When the CPU 311 determines that image forming operation has been started, the process proceeds to step S6. In step S6, the CPU 311 switches the electrical power changing switch SW1 to the contact b and the electrical power changing switch SW2 to the contact c via the electrical power supply I/O interface 315. Electrical power is supplied from the electrical power supply unit 320 to the driving unit 215 in the reader section 10 during image forming operation by this operation. In this case, electrical power supplied to the fixing unit 50 in the printer section 20 is reduced as much as electrical power supplied to the driving unit 215.

On the other hand, when the CPU 311 determines in step S5 that image forming operation has not been started, the process proceeds to step S7. In step S7, the CPU 311 sets the value of a standby flag F set up in the RAM 313 to one and completes the process. When the CPU 311 determines in step S1 that the power switch 86 has not been turned on and the sleep/return key 84 has not been pressed, the CPU 311 determines in step S8 whether the value of the standby flag F is one. When the CPU 311 determines that the value of the standby flag F is one (when the image forming system 1 is in a standby status), the process proceeds to step S4. When the CPU 311 determines that the value of the standby flag F is zero, the CPU 311 completes the process.

In the image forming system according to the first exemplary embodiment, during initialization, electrical power is supplied from the secondary battery 212 to the reader section 10, as described above. Thus, sufficient electrical power (1400 W in the present exemplary embodiment) can be supplied to the fixing unit 50 in the printer section 20 regardless of whether the reader section 10 is connected to the printer section 20. Accordingly, the temperature of the fixing unit 50 can be quickly increased to the fusing temperature. Moreover, the secondary battery 212 is provided in the reader section 10. Thus, unnecessary cost can be eliminated for a user who does not use the reader section 10 and uses only the printer section 20. The same advantage can be achieved even when the secondary battery 212 is provided in optional devices other than the reader section 10.

Second Exemplary Embodiment

In the image forming system according to the first exemplary embodiment, when a period during which the image forming system 1 is in a standby status is very short because the power switch 86 is turned off just after image forming operation has been completed, the secondary battery 212 may not be charged sufficiently. Thus, when the image forming system 1 is activated by turning on the power switch 86 just after turning off the power switch 86, it may be the case that initial check of peripheral devices cannot be performed due to insufficient charge in the secondary battery 212. Accordingly, in a second exemplary embodiment, when the secondary battery 212 is not charged sufficiently, initialization is performed in the reader section 10 using electrical power supplied from the electrical power supply unit 320 instead of the secondary battery 212.

Figure 5:
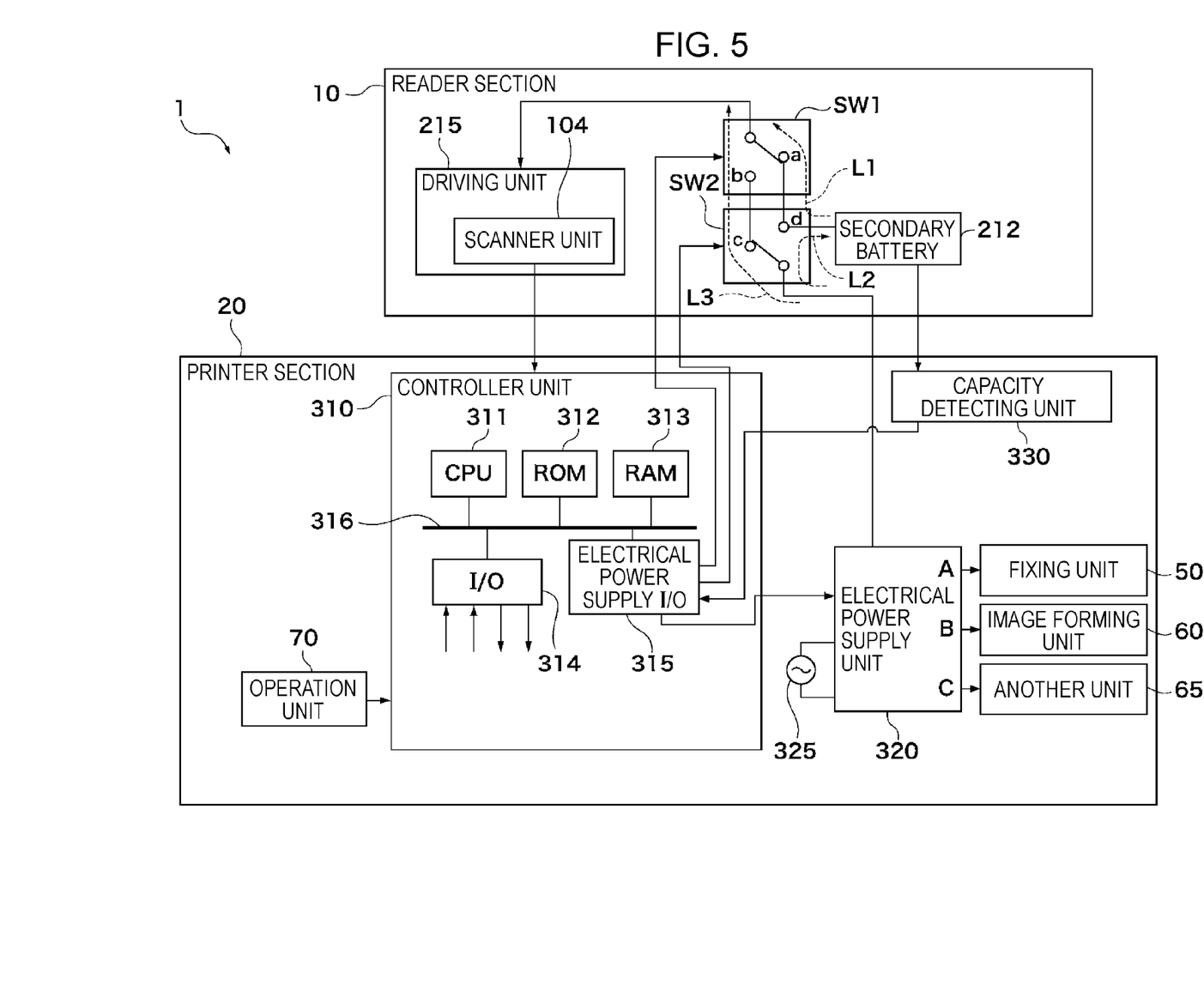
FIG. 5 is an illustration showing the structures of parts related to electrical power supplies of a reader section and a printer section in a second exemplary embodiment.

FIG. 5 is an illustration showing the structures of parts related to electrical power supplies of the reader section 10 and the printer section 20 in the second exemplary embodiment. The same reference numerals as in the first exemplary embodiment are assigned to corresponding components, and the description of these components is omitted here. In the second exemplary embodiment, the printer section 20 further includes a capacity detecting unit 330 that detects the amount of charge in the secondary battery 212. The capacity detecting unit 330 is connected to the electrical power supply I/O interface 315 in the controller unit 310, and the output from the capacity detecting unit 330 is sent to the CPU 311.

Figure 6:
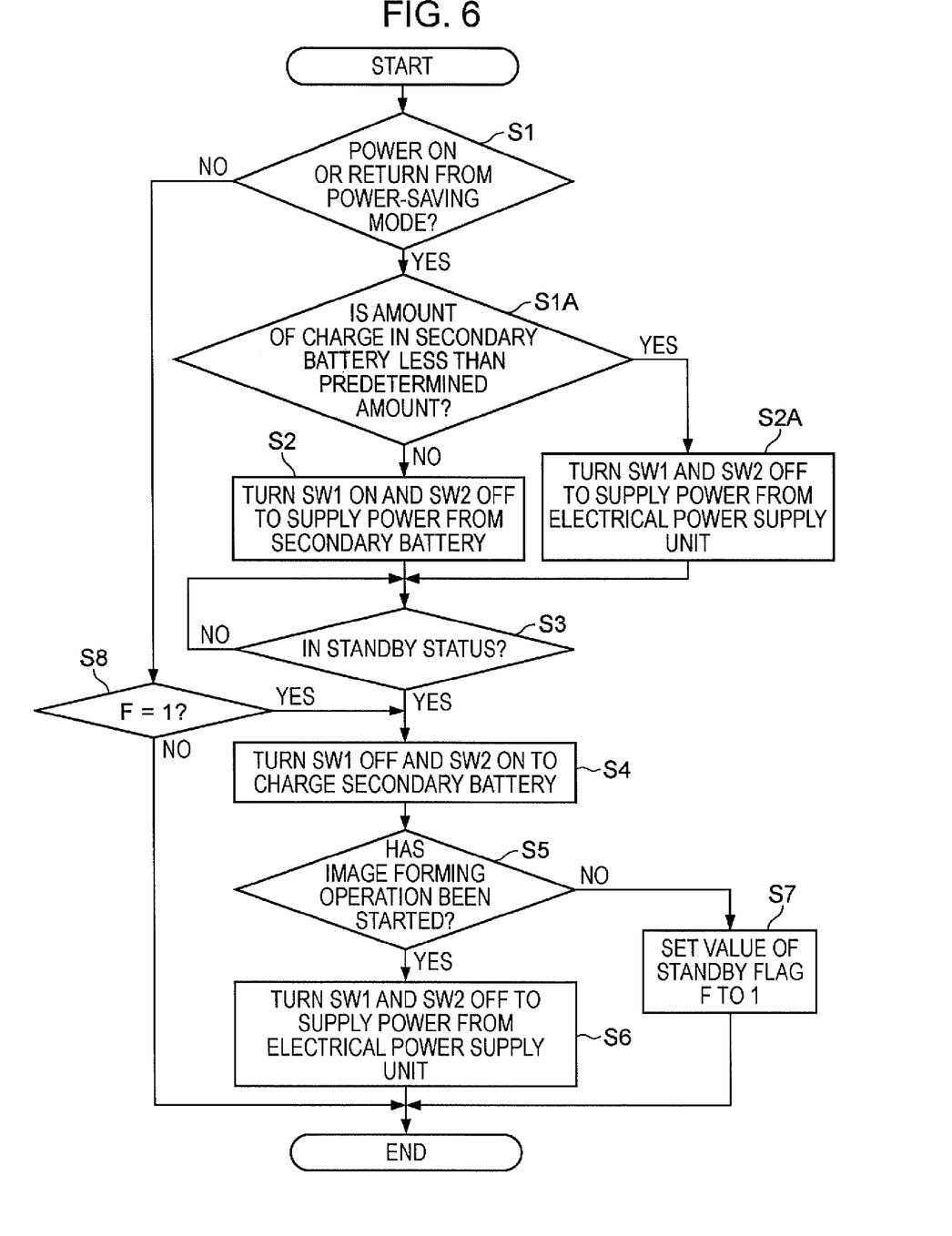
FIG. 6 is a flowchart showing the control process of electrical power supply changing.

FIG. 6 is a flowchart showing the control process of electrical power supply changing. This processing program is stored in the ROM 312 and executed by the CPU 311 at predetermined intervals. The same step numbers as in the first exemplary embodiment are assigned to corresponding steps, and the description of these steps is omitted here.

When the CPU 311 determines in step S1 that the power switch 86 has been turned on or the sleep/return key 84 has been pressed in the power-saving mode, the process proceeds to step S1A. In step S1A, the CPU 311 determines whether the amount of charge in the secondary battery 212 is less than a first predetermined amount. When the CPU 311 determines that the amount of charge in the secondary battery 212 is equal to or more than the first predetermined amount, the process proceeds to step S2. In step S2, the CPU 311 switches the electrical power changing switch SW1 to the contact a (the on side) and the electrical power changing switch SW2 to the contact c (the off side). Electrical power is supplied from the secondary battery 212 to the driving unit 215 in the reader section 10 during initialization by this operation. At the same time, the electrical power supply unit 320 supplies the maximum electrical power of the commercial power supply 325 to the fixing unit 50, the image forming unit 60, and the other unit 65 in the printer section 20 in the foregoing distribution ratio.

On the other hand, when the CPU 311 determines in step S1A that the amount of charge in the secondary battery 212 is less than the first predetermined amount, the process proceeds to step S2A. In step S2A, the CPU 311 switches the electrical power changing switch SW1 to the contact b (the off side) and the electrical power changing switch SW2 to the contact c (the off side). Electrical power is supplied from the electrical power supply unit 320 to the driving unit 215 in the reader section 10 during initialization by this operation.

In this way, in the image forming system according to the second exemplary embodiment, even when the secondary battery 212 is not charged sufficiently upon turning on the power switch 86 or returning from the power-saving mode, the reader section 10 can perform initialization using electrical power supplied from the electrical power supply unit 320. Moreover, in a standby status, the secondary battery 212 can be charged using electrical power from the electrical power supply unit 320, as in the first exemplary embodiment.

In the second exemplary embodiment, the capacity detecting unit 330 is provided in the printer section 20, which is an image forming apparatus. Alternatively, the capacity detecting unit 330 may be provided in the reader section 10, which is a peripheral device.

In the second exemplary embodiment, during initialization, the electrical power supply that supplies electrical power to the driving unit 215 in the reader section 10 is changed in response to the amount of charge in the secondary battery 212. Furthermore, the same control may be performed when the image forming operation has been started. That is to say, after the CPU 311 determines in step S5 in FIG. 6 that image forming operation has been started, the CPU 311 may determine whether the amount of charge in the secondary battery 212 is less than a second predetermined amount. When the CPU 311 determines that the amount of charge in the secondary battery 212 is less than the second predetermined amount, the electrical power supply unit 320 in the printer section 20 supplies electrical power to the driving unit 215 in the reader section 10. Otherwise, the secondary battery 212 supplies electrical power to the driving unit 215. Electrical power consumed when the image forming operation is performed can be reduced by this operation. The second predetermined amount may be the same as the first predetermined amount or larger than the first predetermined amount.

Third Exemplary Embodiment

Figure 7:
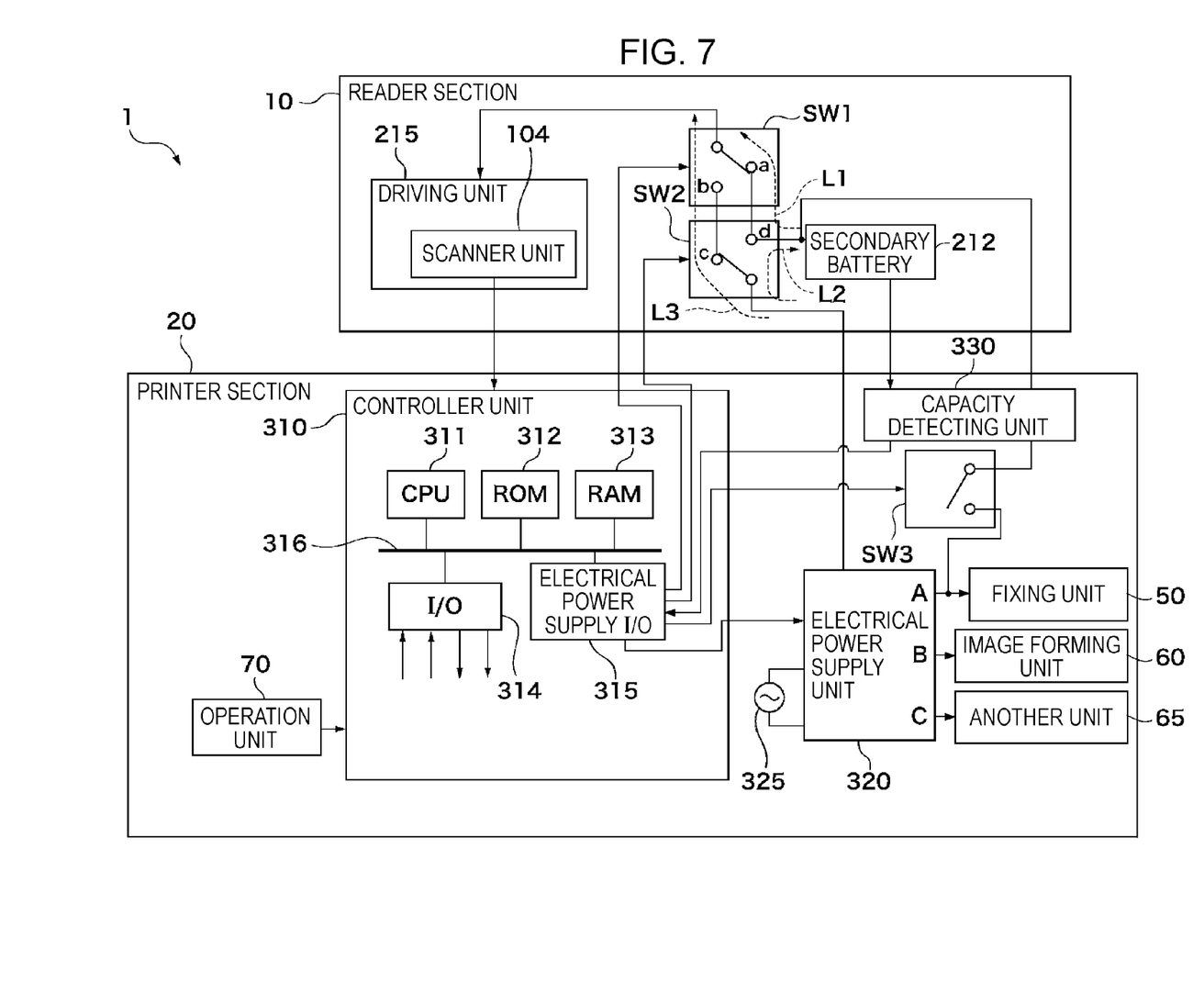
FIG. 7 is an illustration showing the structures of parts related to electrical power supplies of a reader section and a printer section in a third exemplary embodiment.

In a third exemplary embodiment, during image forming operation, electrical power is supplied to the fixing unit 50 from both the electrical power supply unit 320 and the secondary battery 212. FIG. 7 is an illustration showing the structures of parts related to electrical power supplies of the reader section 10 and the printer section 20 in the third exemplary embodiment. The same reference numerals as in the second exemplary embodiment are assigned to corresponding components, and the description of these components is omitted here.

In the third exemplary embodiment, an electrical power changing switch SW3 is provided between the secondary battery 212 and the fixing unit 50. The electrical power changing switch SW3 is connected to the electrical power supply I/O interface 315 in the controller unit 310 and is turned on and off in response to an instruction from the CPU 311.

Figure 8:
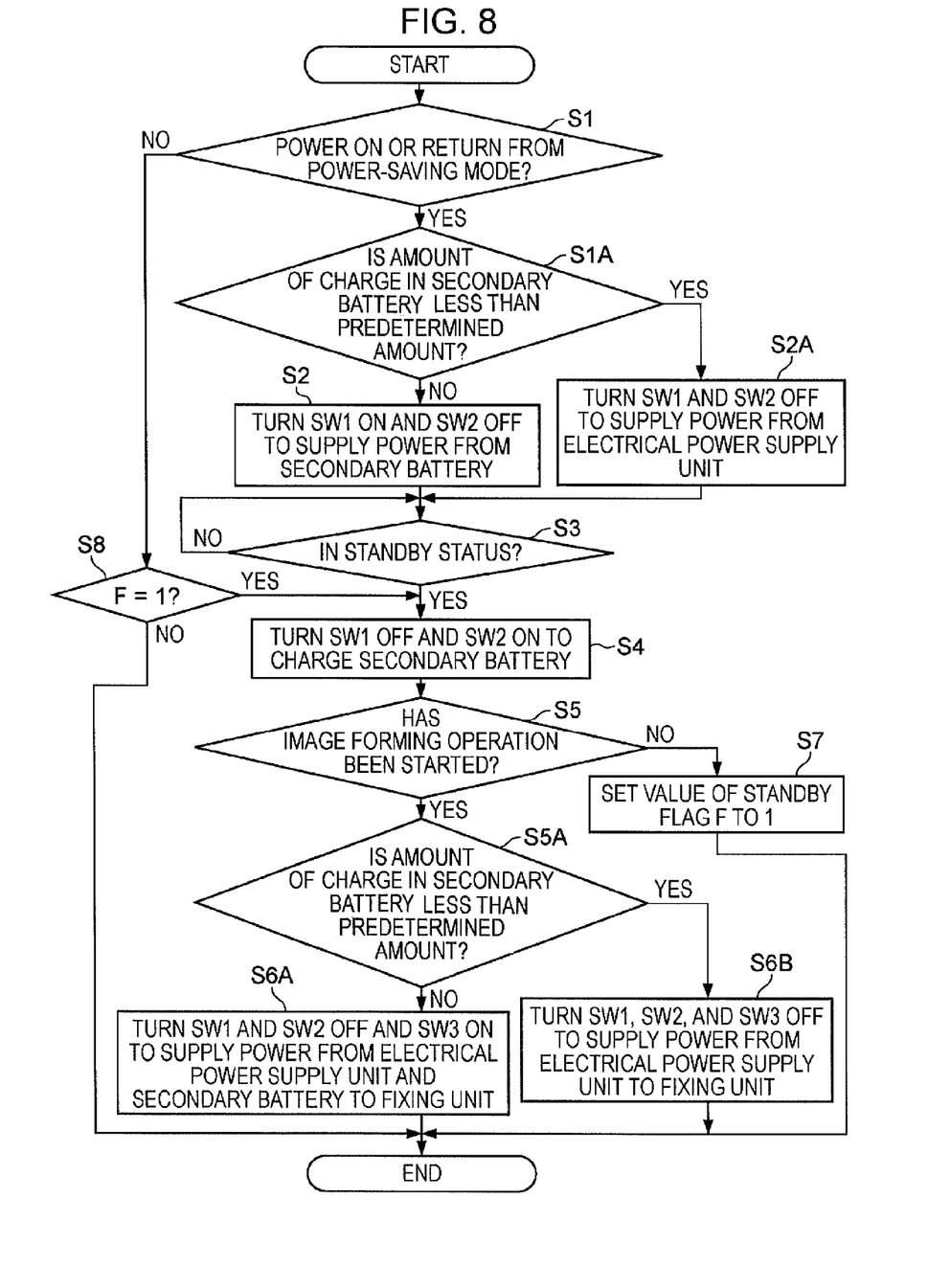
FIG. 8 is a flowchart showing the control process of electrical power supply changing.

FIG. 8 is a flowchart showing the control process of electrical power supply changing. This processing program is stored in the ROM 312 and executed by the CPU 311 at predetermined intervals. The same step numbers as in the second exemplary embodiment are assigned to corresponding steps, and the description of these steps is omitted here.

When the CPU 311 determines in step S5 that image forming operation has been started, the process proceeds to step S5A. In step S5A, the CPU 311 determines whether the amount of charge in the secondary battery 212 is less than a predetermined amount. When the CPU 311 determines that the amount of charge in the secondary battery 212 is equal to or more than the predetermined amount, the process proceeds to step S6A. In step S6A, the CPU 311 switches the electrical power changing switch SW1 to the contact b, the electrical power changing switch SW2 to the contact c, and the electrical power changing switch SW3 to the on position. During image forming operation, electrical power is supplied to the fixing unit 50 from both the electrical power supply unit 320 and the secondary battery 212 by this operation at the same time electrical power is supplied to the driving unit 215 in the reader section 10 from the electrical power supply unit 320.

On the other hand, when the CPU 311 determines in step S5A that the amount of charge in the secondary battery 212 is less than the predetermined amount, the process proceeds to step S6B. In step S6B, the CPU 311 switches the electrical power changing switch SW1 to the contact b, the electrical power changing switch SW2 to the contact c, and the electrical power changing switch SW3 to the off position. During image forming operation, electrical power is supplied to the driving unit 215 in the reader section 10 and the fixing unit 50 only from the electrical power supply unit 320 by this operation.

In step S6A, electrical power may not be supplied to the driving unit 215 in the reader section 10 from the electrical power supply unit 320. Alternatively, electrical power may be supplied to the driving unit 215 from the secondary battery 212. The predetermined amount used in step S5A during image forming operation may be the same as or larger than a predetermined amount used in step S1A during initialization.

In this way, in the image forming system according to the third exemplary embodiment, when the amount of charge in the secondary battery 212 is equal to or more than the predetermined amount, sufficient electrical power can be supplied to the fixing unit 50. Thus, a full color image can be formed on thick paper, which easily absorbs heat of the fixing unit 50, with satisfactory quality. Moreover, electrical power supplied from the electrical power supply unit 320 to the fixing unit 50 can be reduced as much as electrical power supplied from the secondary battery 212 to the fixing unit 50. Thus, consumption of electrical power supplied from the commercial power supply 325 can be reduced when an image forming operation is performed.

The present invention is not limited to the foregoing exemplary embodiments and may be applied to any other embodiments as far as the functions defined in the claims and the foregoing exemplary embodiments can be implemented.

In the foregoing exemplary embodiments, the secondary battery 212 and the electrical power changing switches SW1 and SW2 are provided in the reader section 10 (an optional device), and a changing control section (the CPU 311, the electrical power supply I/O interface 315, and the like in the controller unit 310) is provided in the printer section 20 (an image forming apparatus). Alternatively, only the electrical power changing switches SW1 and SW2 may be provided in the printer section 20. Furthermore, the secondary battery 212 and the electrical power changing switches SW1 and SW2 may be provided in a device separate from the reader section 10 and the printer section 20.

In the foregoing exemplary embodiments, electrical power is supplied to the reader section 10 from the secondary battery 212 during initialization. Alternatively, an electrical power changing switch may be provided in addition to the electrical power changing switches SW1 and SW2. The electrical power changing switch can combine electrical power from the secondary battery 212 and electrical power from the electrical power supply unit 320 and establish a path for supplying the combined electrical power to the reader section 10. In this case, electrical power supplied from the electrical power supply unit 320 to the reader section 10 may be smaller than that in a case where electrical power is supplied to the reader section 10 only from the secondary battery 212. That is to say, the electrical power supply unit 320 supplies electrical power that is smaller than electrical power necessary for initialization in the reader section 10 to the reader section 10. Thus, during initialization, electrical power supplied from the electrical power supply unit 320 to the fixing unit 50 is just a little smaller than that in the first exemplary embodiment. Moreover, a period during which the secondary battery 212 can supply electrical power can be extended.

In the foregoing exemplary embodiments, the optional (auxiliary) device is a reader section 10. However, the optional device is not limited to a reader section 10. Another typical optional device is a paper deck, a stapler unit, a paper folding unit, a sorting unit, a punching unit, an automatic reversing document feeder, an inserting unit, a cutting unit, or a glossing unit. Such an optional device includes a secondary battery, and a driving unit in the optional device performs initial check and the like during initialization using electrical power from the secondary battery.

In the foregoing exemplary embodiments, the image forming system 1 is a multi functional printer (MFP) that has a printing function, a copying function, a scanning function, and the like. Alternatively, the image forming system 1 may be an ordinary copying machine, an ordinary printer, or a facsimile machine that has a printing function. Moreover, the present invention may be applied to a system that includes a plurality of units or a device that includes a single unit.

The present invention is also achieved by an embodiment in which a storage medium that stores program code of software that performs the functions according to the foregoing exemplary embodiments is provided to a system or a device and a computer (or a CPU, a micro processing unit (MPU), or the like) included in the system or the device reads and executes the program code stored in the storage medium.

In this case, the program code read from the storage medium performs the functions according to the foregoing exemplary embodiments, and thus the present invention includes the program code and the storage medium, which stores the program code.

The following media can be used as storage media that are used to supply the program code: for example, a floppy disk, a hard disk, a magneto-optical disk, an optical disk, such as a compact disk ROM (CD-ROM), a CD recordable (CD-R), a CD rewritable (CD-RW), a digital versatile disk ROM (DVD-ROM), a DVD-RAM, a DVD-RW, or a DVD rewritable (DVD+RW), a magnetic tape, a nonvolatile memory card, and a ROM. Alternatively, the program code may be downloaded via networks.

Moreover, an operating system (OS) operating on a computer may execute some or all of the actual processing to perform the functions of the foregoing exemplary embodiments according to instructions from the program code.

Moreover, the program code read from the storage medium may be written to a memory included in, for example, a function expansion board inserted in a computer or a function expansion unit connected to a computer. Then, for example, a CPU included in the function expansion board, the function expansion unit, or the like may execute some or all of the actual processing to perform the functions of the foregoing exemplary embodiments according to instructions from the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-342557 filed Nov. 28, 2005, which is hereby incorporated by reference herein in its entirety.

What is claimed:

1. An image forming system includes an image forming apparatus that forms an image on a sheet and a peripheral device that is connected to the image forming apparatus, said image forming system comprising:
   an electrical power supply unit that, provided in said image forming apparatus, supplies electrical power to the image forming apparatus and the peripheral device;
   a driving unit that, provided in said peripheral device, drives load on the peripheral device;
   a electric energy storage device that, provided in said peripheral device, supplies electrical power to the driving unit and is charged repeatedly with electrical power from the electrical power supply unit;
   an electrical power changing device that activates or deactivates a first supply path for supplying electrical power from the electrical power supply unit to the electric energy storage device and activates or deactivates a second supply path for supplying electrical power from the electric energy storage device to the driving unit; and
   a controller unit that controls the electrical power changing device so as to deactivate the first supply path and activate the second supply path when initialization of the image forming system is performed.

2. The image forming system according to claim 1, wherein the electrical power changing device further activates or deactivates a third supply path for supplying electrical power from the electrical power supply unit to the driving unit, and the controller unit controls the electrical power changing device so as to deactivate the third supply path when initialization of the image forming system is performed.

3. The image forming system according to claim 1, wherein when the image forming system is in a standby status in which said image forming apparatus waits for the start of an image forming operation, the controller unit controls the electrical power changing device so as to activate the first supply path and deactivate the second supply path to charge the electric energy storage device.

4. The image forming system according to claim 1, wherein the electrical power changing device further activates or deactivates a third supply path for supplying electrical power from the electrical power supply unit to the driving unit, and the controller unit controls the electrical power changing device so as to deactivate the first and second supply paths and activate the third supply path during image forming operation.

5. The image forming system according to claim 1, further comprising:
   a capacity detecting unit that detects amount of charge in the electric energy storage device,
   wherein, when initialization of the image forming system is performed, the controller unit controls the electrical power changing device so as to activate the second supply path when the amount of charge in the electric energy storage device detected by the capacity detecting unit is equal or more than a predetermined amount and deactivate the second supply path when the amount of charge in the electric energy storage device is less than the predetermined amount.

6. The image forming system according to claim 1, wherein the image forming apparatus further includes a fixing unit that fixes a toner image transferred to a sheet, and the electrical power supply unit supplies electrical power to the fixing unit when initialization of the image forming system is performed.

7. The image forming system according to claim 6, further comprising:

a capacity detecting unit that detects amount of charge in the electric energy storage device; and another electrical power changing device that activates or deactivates a third supply path for supplying electrical power from the secondary battery to the fixing unit, wherein the controller unit controls the other electrical power changing device so as to activate the third supply path when the amount of charge in the electric energy storage device detected by the capacity detecting unit is equal to or more than a predetermined amount.

8. The image forming system according to claim 1, wherein, when initialization of the image forming system is performed, the electrical power supply unit supplies electrical power that is smaller than electrical power required by the driving unit to the driving unit.

9. The image forming system according to claim 8, wherein the electrical power changing device further activates or deactivates a third supply path for combining electrical power from the electric energy storage device and electrical power from the electrical power supply unit, and the controller unit controls the electrical power changing device when initialization of the image forming system is performed so as to activate the third supply path.

* * * * *